United States Patent [19]

Veistroffer et al.

[11] Patent Number: 5,039,929
[45] Date of Patent: Aug. 13, 1991

[54] AUTOMATIC CHARGER CAPABLE OF CHARGING SEVERAL BATTERIES

[75] Inventors: Rene Veistroffer, Nanterre; Jean-Pierre Boneil, Rocquencourt, both of France

[73] Assignee: Aglo S.A., Suresnes, France

[21] Appl. No.: 352,203

[22] Filed: May 16, 1989

[30] Foreign Application Priority Data

May 16, 1988 [FR] France .................. 88 06550

[51] Int. Cl.⁵ .................. H02J 7/00; H01M 10/46
[52] U.S. Cl. .................. 320/2; 320/15
[58] Field of Search .................. 320/2, 3, 4, 5, 15, 320/39, 40, 48; 361/378

[56] References Cited

U.S. PATENT DOCUMENTS 3,696,283 10/1972 Ackley, III .................. 320/2
4,591,777 5/1986 McCartey et al. .................. 320/15 X
4,647,831 3/1987 O'Malley et al. .................. 320/2
4,739,242 4/1988 McCartey et al. .................. 320/15 X
4,748,344 5/1988 Sing .................. 320/2 X Primary Examiner—Steven L. Stephan
Assistant Examiner—Kristine Peckman
Attorney, Agent, or Firm—Antonelli, Terry, Stout & Kraus

[57] ABSTRACT

An automatic charger is provided capable of charging several removable batteries comprising a block for supplying electric power from the mains and several battery charging modules. It comprises at least one electric connection and fixing rail on which the power supply block and the charging modules are connected and rigidly and removably fixed, with means for automatically controlling initiation and stopping of charging, with signalling.

5 Claims, 3 Drawing Sheets

AUTOMATIC CHARGER CAPABLE OF CHARGING SEVERAL BATTERIES

The present invention relates to automatic chargers capable of charging several removable batteries (accumulators) of the type comprising a common block for supplying electric power and several battery charging modules, each module, includes a regulation device adapted to deliver a constant charging current to the battery, a device for detecting the presence of a battery in the module and a device for automatically signalling the beginning and ending of the process of charging the battery.

The present invention is useful for charging nickel cadmium batteries, accumulators or rechargeable cells of small volume having a voltage of 6 V to 24 V or more, which and which require a charging time between 1 and 7 hours for example.

Battery charges of the above defined type are already known, for example for several radio transceivers, for automatically initiating and stopping the charging of the batteries which are connected to the chargers. The chargers of the prior art are not however adapted for charging different types of batteries at different voltages.

An object of the present invention is to provide an automatic charger capable of charging several batteries (accumulators) which performs better than those known heretofore. A charger in accordance with the present invention permits automatic charging of batteries, without the risk of overcharging, irrespective of the initial charged state of the batteries. The automatic charger also permits simultaneous charging of several batteries, of different volume, capacity and voltage with the same power supply block. The present invention permits a charging module to be changed in the case of failure, without having to immobilize or change all the charging modules and the power supply block.

The present invention is simple and inexpensive to manufacture and is easy and reliable to use.

To this end, the invention provides an automatic charger capable of charging several removable batteries of the accumulator or rechargeable cell type, comprising a block for supplying electric power to several battery charging modules, each module including regulation means for delivering charging current to the battery to be charged, and means for detecting the presence of said battery in the module and for automatically controlling and signalling the charging of said battery, said charger including at least one elongate connection rail on which the power supply block and the charging modules are electrically connected and rigidly fixed, the connecting rail having a series of conductors for feeding the different voltages of the block to the modules. The block and each module comprise tongues which electrically contact said conductors when either the block or each module is fixed rigidly to said rail.

The present invention will be better understood from a particular embodiment given by way of example hereafter, with reference to the accompanying drawings in which:

FIG. 1 shows an automatic charger of the invention, illustrated for example for batteries, accumulators or rechargeable cells.

Charger 1 comprises a power supply block 3 fed, by means of a cable 1a, from an electric supply of 220 V or 117 V, 50/60 Hz, and four charging modules 4a, 4b, 4c, 4d for batteries 2a, 2b, 2c, 2d.

The power supply block is formed in a way known per se and makes it possible to supply each module with rectified and smoothed voltages.

The charging modules are of similar construction, but are adapted to the dimensions and characteristics (desired voltage, capacity, recharging rate, etc...) of the batteries which they are to recharge.

Figure 1:
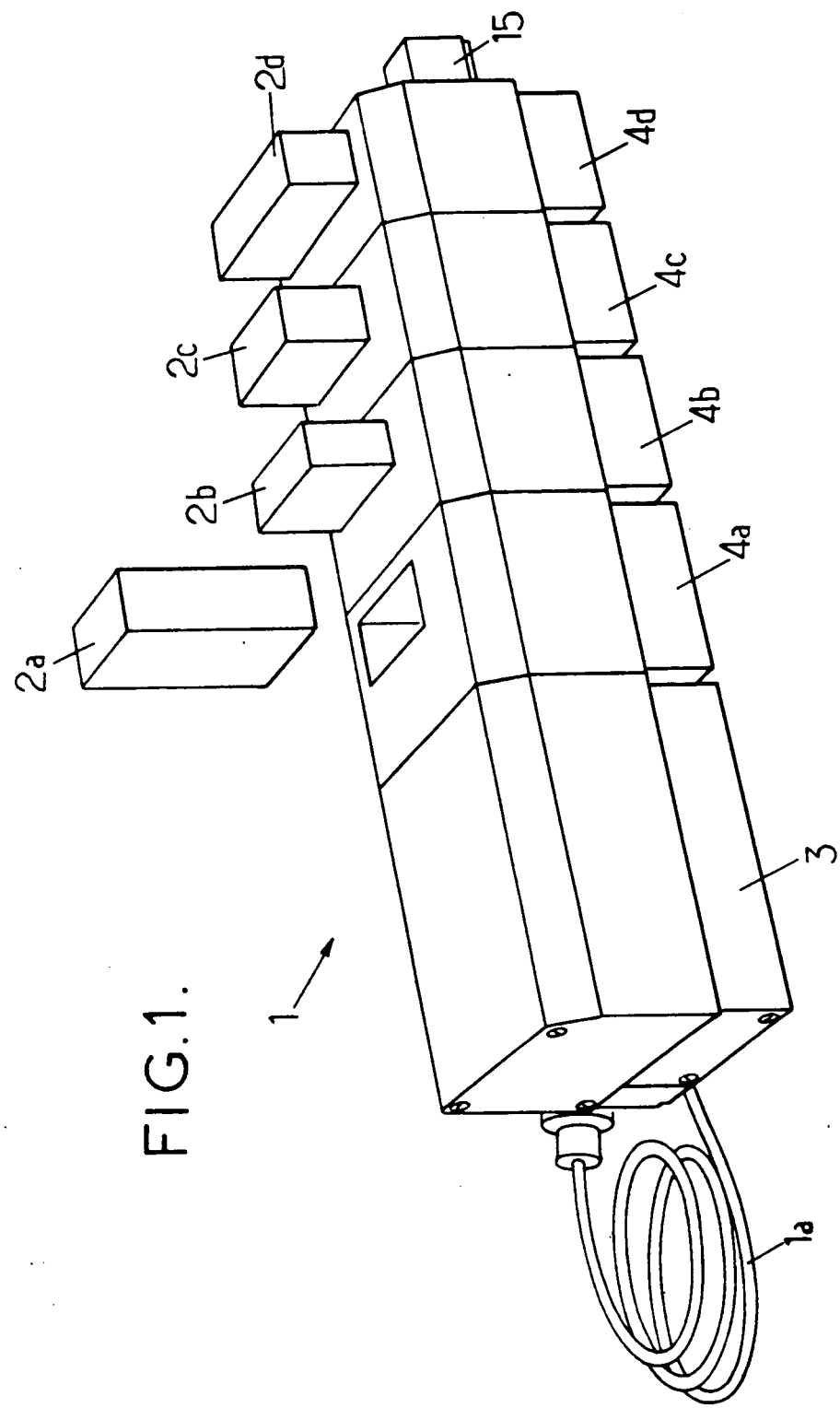
FIG. 1 is a schematic perspective view of a charger, in accordance with the invention, comprising four charging modules.
Figure 2:
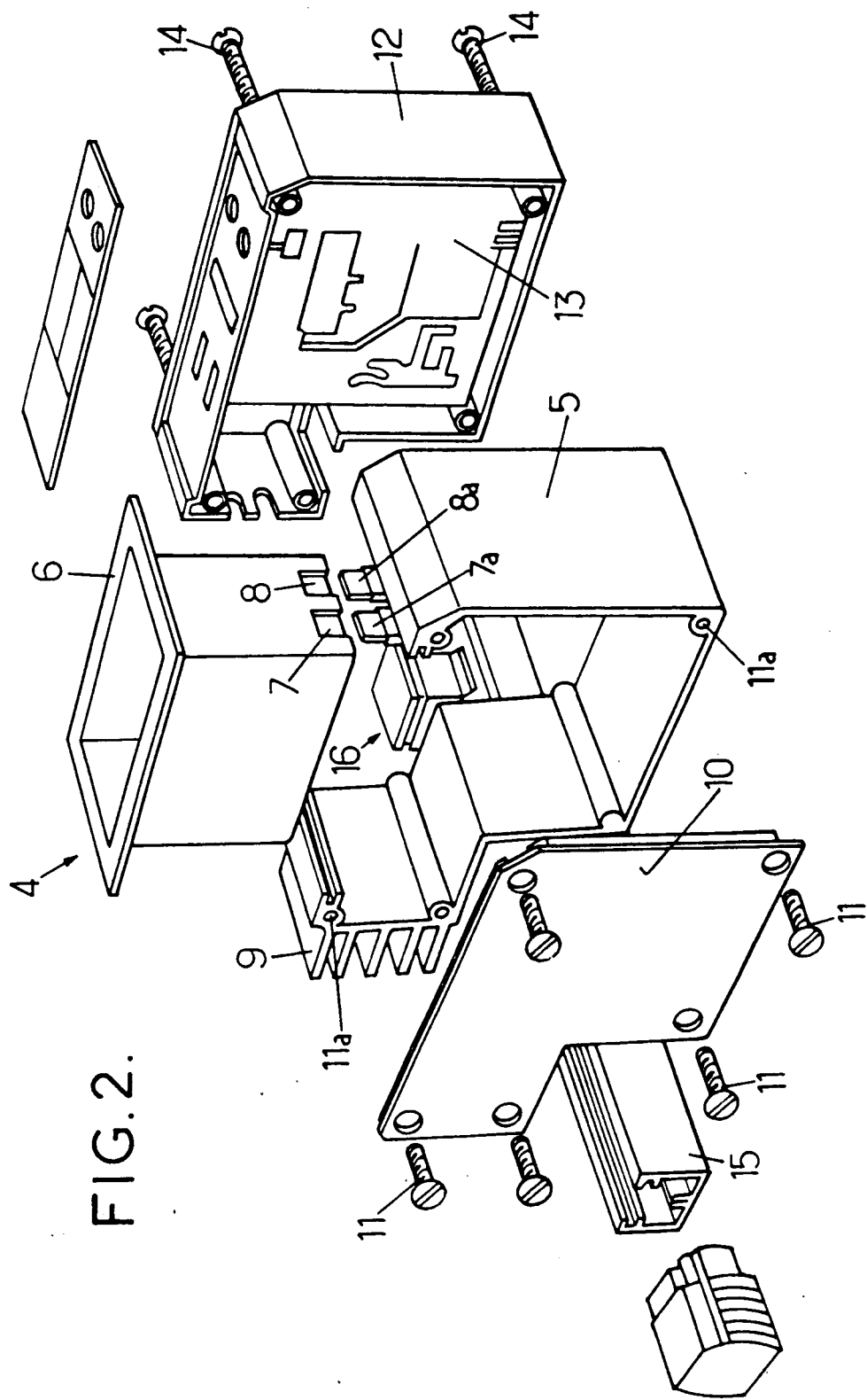
FIG. 2 is an exploded view in perspective of one embodiment of one of the charging modules of FIG. 1.

FIG. 2 shows a charging module, referenced 4, of the type in accordance with the invention and showing one of the modules 4a, 4b, 4c, 4d.

Module 4 comprises a body 5 of variable dimensions, which serves as a support for a receptacle 6 in which a battery to be recharged is introduced. The bottom of receptacle 6 is connected to the module by positive and negative 7-7a and 8-8a electric connections 9.

Body 5 further comprises cooling fins 9, a removable side cover 10 fixed to body 5 by screws 11, screwed into tapped holes 11a in the body, and a casing 12, also removable and fixed to the body 5 by screws 14 screwed into tapped holes in the body.

Casing 12 carries an electronic card or integrated circuit 13 ensuring operation of the module.

Figure 3:
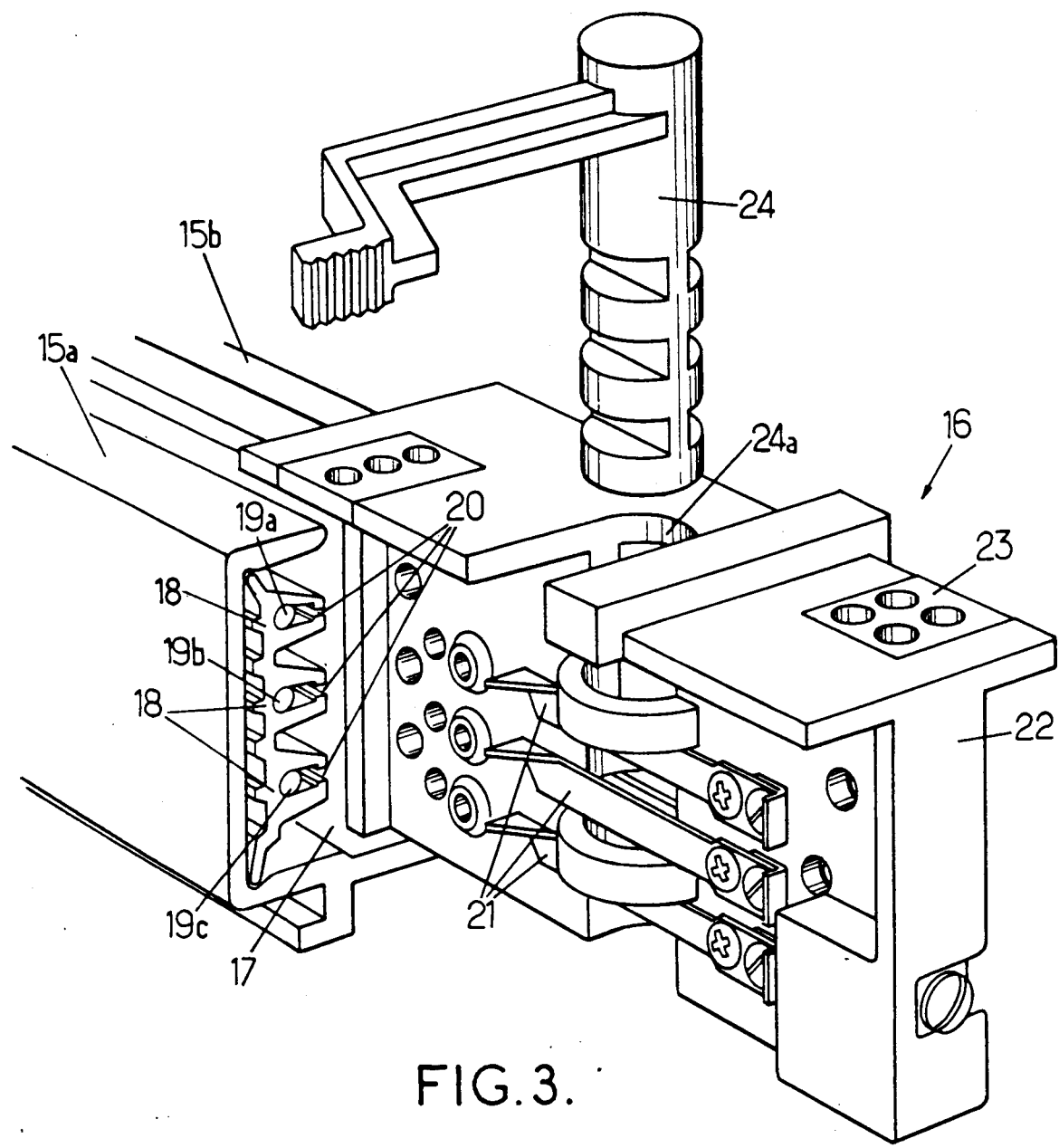
FIG. 3 is a perspective view of one embodiment of the means for fixing the power supply block or a charging module on the fixing and connection rails of the charger, as shown in FIG. 1.

Charger 1 further comprises two longitudinal rails 15a and 15b as illustrated in FIG. 3 for fixing and providing electric connections between the power supply block 3 and the charging modules, block 3 and modules 4a, 4b, 4c, 4d being fixed rigidly but removably on rails 15a and 15b, which makes it possible to replace them or repair any of them without immobilizing the rest of the charger.

In FIG. 3 an advantageous embodiment has been shown of the means 16 for fixing and connecting the block and the charging modules on rails 15a and 15b.

Each rail 15a, 15b comprises a longitudinal cavity 17 open along its upper face, in which three conducting paths 18 are fixed, those of rail 15a having three conductors 19a, 19b, 19c respectively feeding the voltages of $+12$ V, 12 V and $+5$ V for the electronic card 13, whereas those of rail 15b feed the supply voltages at $+24$ V and $-24$ V for charging.

Each cable path 18 of rails 15a and 15b has a longitudinal groove 20 for connecting the three conductors, such as 19a, 19b, 19c to three contact tongues 21 fixed on a support 22 which is fastened to a module or the power supply block. Tongues 21 are connected electrically, for example at 23, to the module or to the power supply block.

Support 22 is adapted for cooperating with cavity 17. It may slide along and inside rails 15a and 15b for placing the module or block in a desired position on the rails, or removing it therefrom. When the support is locked on the rails, tongues 21 are in contact with the respective conductors such as 19a, 19b, 19c.

To provide efficient locking, support 22 may receive, in a housing 24a, a key 24 for locking/unlocking support 22 on rails 15a, 15b, by turning the key through 90°.

Each charging module comprises an electronic card 13 having means for automatically starting up charging of a battery when the latter is introduced into the module and means for automatically stopping charging of the battery when charging is finished, with means for signalling these different phenomena.

The construction of the electronic means carried by the electronic card 13 of the charging module of the invention is described in a patent application Ser. No. 352,204 filed this same day by the Applicant and claiming the same priority as the present application.

We claim:

1. An automatic charger capable of charging a plurality of removable batteries of a rechargeable cell type, said automatic charger comprising:
    a supply block for supplying electric power from a power supply;
    a plurality of battery charging modules, each of said modules including:
    a receptacle for receiving a respective one of said removable batteries, said receptacle being supplied by said supply block with a rectified and smoothed voltage;
    regulation means for delivering a regulated charging voltage to said respective removable battery;
    means for detecting a presence of said respective removable battery in said receptacle;
    means for automatically controlling the starting and stopping of the charging of said respective removable battery;
    means for providing a signal indicative of the starting and stopping of the charging of said respective removable battery;
    said automatic charger further including:
    at least one elongate electrical connector electrically connected with said supply block and said plurality of battery charging modules, said at least one elongate electrical connector including a fixing rail to which said supply block and said plurality of battery charging modules are rigidly fixed, said fixing rail including a plurality of conductors for supplying said rectified and smoothed voltage from said supply block to said plurality of battery charging modules, each of said plurality of battery charging modules including a plurality of contacts which provide electrical connections with said plurality of conductors when at least one of said plurality of battery charging modules is rigidly fixed to said fixing rail.

2. An automatic charger according to claim 1, wherein said fixing rail includes a plurality of conductor paths, said plurality of conductor paths each securing a respective one of said plurality of conductors therein, each of said conductor paths including a groove therein for receiving a respective one of said plurality of contacts of at least one of said plurality of battery charging modules.

3. An automatic charger according to claims 1 or 2, wherein each of said plurality of battery charging modules further includes a rotatable key for enabling said plurality of battery charging modules to lock to and unlock from said fixing rail.

4. An automatic charger according to claim 3, wherein said at least one elongate electrical connector is actually two elongate electrical connectors, said supply block and said plurality of battery charging modules being disposed between said two elongate electrical connectors.

5. An automatic charger according to claim 1, wherein said plurality of conductors of said fixing rail supply each of said plurality of battery charging modules with a plurality of rectified and smoothed voltages.

* * * * *